March 24, 1953
C. B. ESTES
2,632,369
FILM MEASURING MECHANISM
Filed Oct. 22, 1949
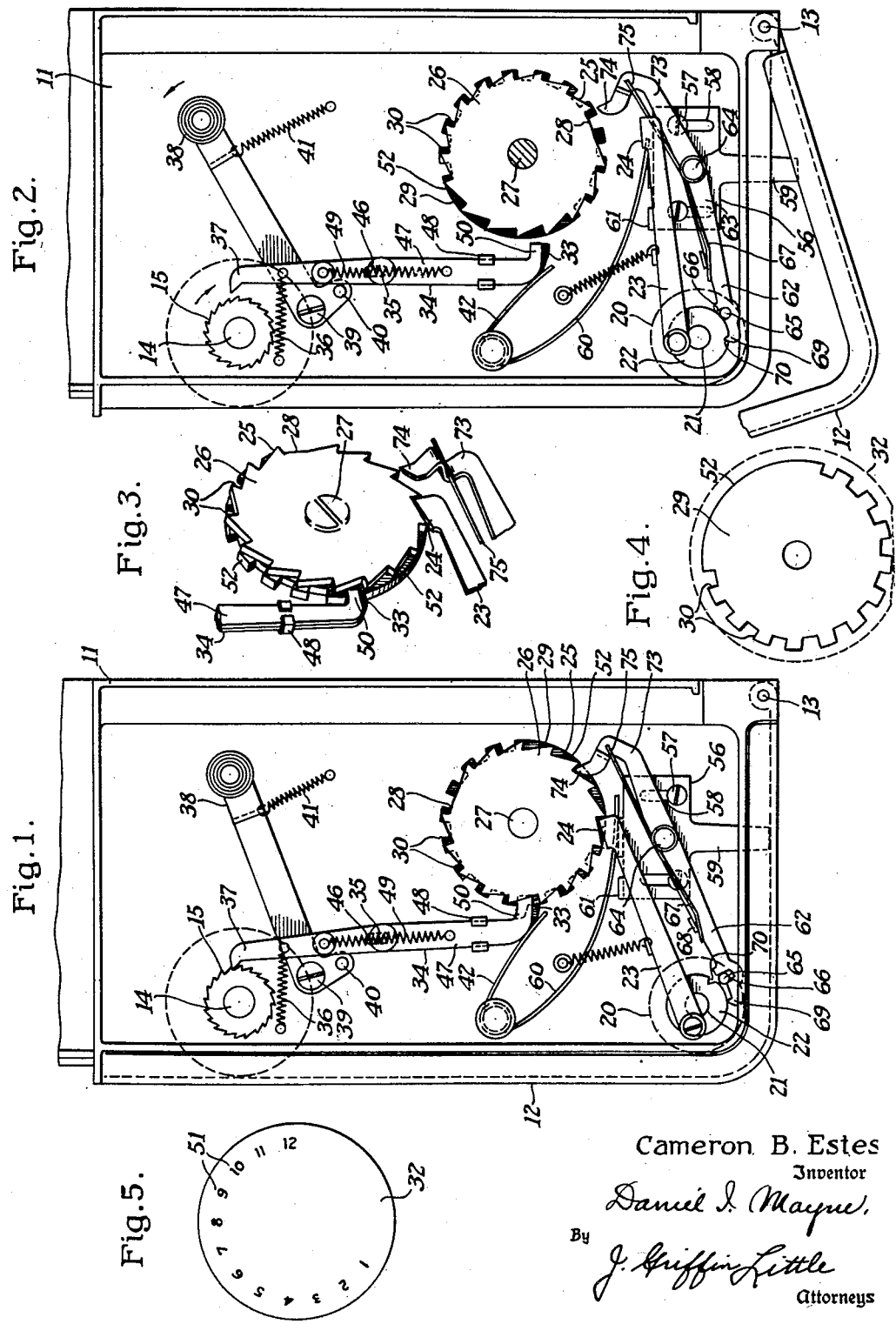
Cameron B. Estes
Inventor
By Daniel I. Mayne
J. Griffin Little
Attorneys Patented Mar. 24, 1953

2,632,369

UNITED STATES PATENT OFFICE 2,632,369

FILM MEASURING MECHANISM

Cameron B. Estes, Rochester, N. Y., assignor to Eastman Kodak Company, Rochester, N. Y., a corporation of New Jersey Application October 22, 1949, Serial No. 123,080

10 Claims. (Cl. 95—31)

The present invention relates to roll film cameras, and more particularly to a film metering mechanism therefor.

As is well known, in cameras of this type, it is desirable to provide a mechanism which will lock the film winding or moving means automatically after an exposed image area has been wound on to the take-up spool or spindle, and an unexposed frame has been moved into exposing position. With such a mechanism, it is desirable to provide an arrangement by which the locking mechanism may be disengaged or rendered inoperative after the last exposure is made to permit the winding up of the trailer strip. Also, when the camera back is opened, the locking mechanism is disengaged to free the winding spindle to permit threading and winding of the leader strip. However, when the back is opened, the operator may inadvertently, or possibly intentionally, manipulate the control for the locking mechanism, thus throwing the latter out of phase. The result may be that after the camera is closed and several exposures are made, the control mechanism may be moved to a position to throw or move the locking mechanism to its inoperative position so that subsequent winding of the film will not serve to lock the winding mechanism, the disadvantages of which are apparent.

Accordingly, it is highly desirable to provide means for maintaining the elements of the locking mechanism in proper phased relation so as to lock the winding mechanism successively only after each exposure area is moved and not to release the locking mechanism permanently until the last exposure area is wound up on the take-up spool or spindle. For this reason, it is desirable to provide an arrangement by which at least part of the control for the locking mechanism is locked so as to insure the retention of the proper phased relation of the entire mechanism when the camera back is closed after threading.

To insure this result, the present invention provides a structure in which certain of the parts are disconnected automatically and completely when a camera back is opened. The winding of the leader strip then serves to properly phase the parts which are controlled directly by the film strip. After these parts are properly phased, they are then locked in their adjusted or phased relation. Then, when the camera back is closed, the parts of the mechanism are connected in proper phased relation so as to insure the automatic and accurate locking of the winding mechanism after each exposure is wound up. Furthermore, due to the proper phase adjustment, the locking mechanism is not released completely or put into its free-wheeling position until the last exposure is made and the last exposure has been wound on to the take-up spool or spindle. Thus, the locking mechanism is not rendered inoperative until the entire exposed section of the film is wound. In the claims where it states that the mechanism reaches a neutral or free-wheeling position only after the strip is completely wound, such statement refers only to the complete winding of the film strip bearing the full number of exposures. Of course, after the last exposure, a paper or film trailer strip is yet to be wound. Such additional winding is possible because the locking mechanism is in its neutral or free-wheeling position, and is disconnected from the winding spindle to free the latter to permit unrestricted winding of the trailer portion or strip. The essential point is that the locking mechanism is not rendered inoperative until the entire number of exposures have been made and wound up, thus assuring the complete us of the sensitized film strip, the advantages of which are apparent.

The present invention thus has as one of its objects, a film metering mechanism which effectively and automatically locks the film winding mechanism as each exposure frame is wound up.

Yet another object of the invention is the provision of a film metering mechanism which is rendered inoperative when, and only when, the last image area has been wound. The rendering of the mechanism inoperative at this time permits easy and unrestricted winding up of the trailer strip, as well as the subsequent winding up of the leader strip as a new film roll is loaded in the camera.

Still another object of the invention is the provision of an arrangement for phasing the parts so as to place the various parts of the locking mechanism, and its control, in proper phased relation before closing the camera back.

Another object of the invention is the provision of an arrangement for separating elements of the mechanism when the camera back is opened for properly phasing the parts thereof which are accessible to the operator and controlled by the moving film to insure that these parts will be properly phased before the camera back is closed.

And another object of the invention is the provision of an arrangement for connecting the parts of the locking mechanism automatically in operative relation when the camera back is closed to insure the maintenance of their phased relation.

And yet another object of the invention is the provision of a phased locking arrangement which is accurate, positive in its action, reliable and highly effective in use.

To these and other ends, the invention resides in certain improvements and combinations of parts, all as will be hereinafter more fully described, the novel features being pointed out in the claims at the end of the specification.

In the drawings:

Fig. 1 is a side elevation view of a roll film camera, with a side plate removed, showing a film metering or locking mechanism constructed in accordance with the present invention, the parts being in their locked position to prevent rotation of the winding spindle to wind up the exposed frame;

Fig. 2 is a view similar to Fig. 1, but with the camera back opened, showing the control parts in their neutral or free-wheeling position, and parts of the mechanism phased;

Fig. 3 is a perspective view of the indexing means in the position when the film has been wound to position the first image area in exposing position;

Fig. 4 is a view of the counter index wheel; and

Fig. 5 is a front view of the counter dial.

Similar reference numerals throughout the various views indicate the same parts.

The drawings show a roll film camera having a body portion 11, the rear of which is closed by a back 12 which is hinged at 13 to the camera body. The back 12 may be moved to its closed position, as viewed in Fig. 1, during exposure of the film strip. However, when the exposed film roll is to be removed and replaced by a new film roll, the back is opened, as shown in Fig. 2, to permit ready and easy access to the film chambers. As the particular camera construction forms no part of the present invention, further details are not illustrated or described. Suffice to say that the new film roll is positioned in a supply chamber at the bottom of the camera, and the leader strip is passed over the exposure frame and secured to a supply spool or spindle positioned at the top of the camera in a manner which is well known to those in the art. The wind-up spindle 14 has mounted thereon a ratchet 15. This spindle and ratchet arrangement is also old and does not per se constitute a part of the present invention.

After threading, the camera back is closed and the exposures are made successively. After each exposure, the locking mechanism is moved to release or free the take-up spindle 14. The latter is then rotated by a suitable knob, not shown, to wind up the exposed image area. When this area has been completely wound and an unexposed area has been moved into exposing position over the exposure frame, it is desirable to lock the spindle against further movement, as is apparent. Also, when the last image area of the film has been wound; that is, when the exposed portion of the film has been completely wound, it is desirable to move the locking means to a released or inoperative position to free the spindle so that it may be rotated freely and sufficiently to wind up the trailing strip. To secure this result, a novel form of metering mechanism has been provided.

This metering mechanism comprises a measuring roll 20 adapted to be engaged and rotated by the film strip or the backing paper during its passage thereover. The roll 20 is of such size as to make one complete revolution when the film is moved a distance of one image frame. The roll 20 may, therefore, be designated as a "single rotation" measuring roll. This roll 20 is fixedly mounted on a shaft 21 which also carries a metering roll eccentric 22 which rotates as a unit with the roll 20 and shaft 21. A counter-actuating pawl 23 has one end eccentrically connected to the eccentric 22 so that upon each rotation of the latter, a complete reciprocation is imparted to pawl 23. Upon each reciprocation of pawl 23, the free end 24 thereof engages a tooth 25 of a counter ratchet wheel 26 to rotate or index the latter the distance of one tooth about a fixed stud 27 on which is mounted an indexing means of which wheel 26 forms a part. The wheel 26, in the present invention, is formed with 16 teeth and a mutilated portion 28 from which one tooth is missing, the purpose of which construction will be later described. The stud 27 also has mounted thereon the balance of the indexing means which comprises a circular counter indexing wheel 29 formed with a plurality of equally-spaced recesses 30, in the present instance 12, to correspond with the number of exposures on the film strip. The wheels 26 and 29 are separated by a suitable spacer disk. A counter dial 32 is also mounted on stud 27. The wheels 26 and 29, the spacer and the dial 32 constitute a single unit which is rotated or turned the distance of one tooth 25, each time a new film area is moved into position because pawl 23 has imparted thereto a single reciprocation during such movement.

As the indexing means is moved by pawl 23, the counter indexing wheel 29 is rotated until one of the recesses 30 thereof is finally brought into registry with a pawl 33 formed on the lower end of a lever 34 pivoted at 35 on the camera body. A spring 36 has one end anchored to the camera body and the other end secured to the lever 34 above pivot 35, and tends to turn the lever 34 in a counter-clockwise relation about pivot 35 to retain pawl 33 in engagement with wheel 29. When the pawl 33 registers with one of the recesses 30, the springs 36 and 42 rock the lever 34 in a counter-clockwise direction to move pawl 33 into the registering recess 30 and such movement also moves a locking pawl 37, formed on the upper end of lever 34, into locking relation with ratchet 15 to arrest further movement of spindle 14.

As mentioned above, the roll 20 and eccentric 22 make one complete revolution each time the film strip is wound a distance of one frame. This movement imparts a single reciprocation to pawl 23 to move wheel 26 a distance of one tooth 24. As wheel 29 is connected to the wheel 26, it will rotate as a unit therewith the distance between adjacent recesses 30. The result is that each time the film has been moved the distance of one frame, a recess 30 registers with pawl 33 and the lever 34 is rocked, by springs 36 and 42, to move the locking pawl 37 into holding or locking relation with ratchet 15. Thus, the spindle 14 is successively locked against rotation at the end of each winding operation in which the film is moved a distance of one frame to wind up the exposed area and to move simultaneously an unexposed area into exposing position.

After the unexposed portion is positioned properly, a shutter, not shown, is actuated to make an exposure. Thereafter, it is necessary to rotate the wind-up spindle 14 to wind up the exposed area. However, before this can be accomplished, it is necessary first to move lever 34 in a clockwise direction to disengage pawl 37 from ratchet 15 to free spindle 14. To secure this result, a release lever 38, pivoted at 39 on the camera body, is moved upwardly in a counter-clockwise direction about pivot 39 to bring a pin 40 into engagement with lever 34. Such engagement imparts a clockwise movement to lever 34 to move pawl 37 out of holding relation with ratchet 15. When the lever 34 is thus rocked, pawl 33 will be withdrawn from recess 30 of wheel 29.

It is apparent that if the lever 38 is now released, the lever 34 will be again rocked in a counter-clockwise direction to shift pawl 33 back into recess 30 and to move pawl 37 into holding relation with ratchet 15 to prevent turning of spindle 14. In order to eliminate this possibility, means is provided for holding the lever 34 in a position so that pawl 33 cannot reenter recess 30. To secure this result, a release pawl 47 overlies lever 34 and has elongated slot formed on its upper end to receive pin 35. A clip 48, carried by lever 34, engages pawl 47 and cooperates with pin 35 to hold pawl 47 in aligned or lateral registration with lever 34 for permitting longitudinal movement relative thereto. A coil spring 49 has one end secured to lever 34 above pin 35 and the other end secured to the pawl 47 below pin 35. This spring tends to move pawl 47 upwardly relative to lever 33 to move the lower end 50 of pawl 47 out of registering relation with pawl 33 of lever 34.

When the wheel 29 has been rotated the proper distance, pawl 33 and lower end 50 of pawl 47 drop into a registering recess 30 under the action of spring 36. However, when lever 38 is actuated to rock lever 34 in a clockwise direction, pawl 33 and end 50 are both withdrawn from the recess 30, clip 48 moving pawl 47 as a unit with lever 34. When the end 50 of pawl 47 is clear of recess 30, the spring 49 serves to shift pawl 47 upwardly relative to lever 34 to move end 50 out of registry with pawl 33. Now, when the lever 38 is released, the end 50 will be out of registry with recess 30 and will engage and ride on the periphery of the wheel 29 between the recesses 39. Due to the connection of lever 34 to pawl 47, by means of clip 48, the pawl 33 is held out of recess 30 so that it will not reenter the latter upon release of lever 38. When, however, the film has been moved a distance sufficient to bring the next recess 30 into registration with pawl 33 and end 50, both of these members move into the registering recess under the action of springs 36 and 42 to permit pawl 37 to engage ratchet 15. Of course, each time wheel 29 is moved the distance between each recess 30, the wheel 26 and a counter dial are similarly moved to bring a numeral 51 on the dial into registry with a viewing opening, not shown, on the side of the cover plate so that the number of exposures can be visually indicated.

The indexing means, illustrated in the present embodiment, is designed for use with a film strip having twelve exposure areas. Accordingly, wheel 29 is provided with twelve recesses 30 which are effective to lock the winding mechanism after each film movement. However, after the twelfth exposure has been made, the lever 38 is again actuated as above described, to lift end 50 and pawl 33 out of the last recess 30. However, as the lever 38 is released, the end 50 now engages a smooth portion 52 on wheel 29. At this time, the pawl 23 has indexed or turned the counter ratchet 26 to position the idling or mutilated area 28 in registry with the end 24 of pawl 23. The area 28 may be formed merely by eliminating or removing one of the teeth 25 of wheel 26, as illustrated. The wheels 26 and 29 are now in the position shown in Fig. 2 and all of the twelve image areas have been wound up on the take-up spindle. Also the pawl 37 is out of holding relation with the ratchet 15 so that the spindle 14 is free, and may be rotated to wind up the trailer strip. As the latter is being wound, the roll 20 is, of course, rotated and reciprocating motion is imparted to pawl 23. However, as the end 24 is in registry with the idling or mutilated area 28, such movement of pawl 23 does not impart any turning movement to wheels 26 and 29 or counter dial 32. The parts remain in the position illustrated in Fig. 2 during the winding up of the trailer strip.

After the trailer strip is wound, the camera back 12 is opened, as shown in Fig. 2, and the exposed film and its protective backing paper or trailer strip are removed. A new film roll is then positioned in the supply chamber and the leader strip is unwound and passed over the exposure frame and secured to the take-up spool connected to spindle 14. In order that the parts will be in proper relation or phased position when the back is again closed so as to insure proper sequence of the film winding and locking mechanism, it is desirable to phase the mechanism during the loading operation. As mentioned above, the wheels 26 and 29 will remain in their idling or free-wheeling position, shown in Fig. 2, during the winding of the trailer strip. As is well known to those in the art, such trailer strips are not always exactly the same length so that various degrees of rotation may be imparted to the roll 20 for different lengths of trailer strips. Such variable rotations obviously will position the roll 20 and the pawl 23 in different relations relative to the wheels 26 and 29. However, in order to insure proper sequence of operation, it is imperative that the roll 20 and pawl 23 be in a definite position relative to the wheels 26 and 29 at the start of the winding operation.

To secure this result, the present invention provides an arrangement by which the roll 20 and pawl 23 are positively disconnected from the indexing means (wheels 26 and 29) when the camera back is opened, as shown in Fig. 2. Now, when the leader strip of the new film is moved over the roll 20, the latter is rotated until it reaches a definite position whereupon it is locked against further rotation to phase the roll 20 and pawl 23 in a manner to be later described. Further movement of the leader strip causes the latter merely to slip over the locked or stationary roller 20. The leader strip is wound until an indexing mark, not shown, is moved to the middle of the exposure frame. When this position is reached, the camera back may then be closed to position the metering mechanism in operative relation.

In order to phase the roll 20 and pawl 23, a carriage 56 is slidably mounted on the camera back by means of a pair of spaced studs 57 which extend through registering slots 58 formed in the carriage. The latter is formed with a depending finger 59 adapted to engage cover 12 so that when the latter is moved to its closed position, the carriage is slid upwardly, against the action of a spring 60, to the position illustrated in Fig. 1. When the back 12 is moved to its opened position, as shown in Fig. 2, the back moves away from the finger 59 and the spring 60 shifts the carriage 56 to its lower position, as illustrated in Fig. 2. This downward movement serves to bring a lug 61 on the carriage 56 into engagement with pawl 23 to rock the latter in a clockwise relation about its pivot and out of engagement with the wheel 26. Thus, the measuring roll 29 is completely and positively disconnected from the indexing means (wheels 26 and 29) when the camera back is opened.

A lever 62 has one end 63 pivotly connected to carriage 56 by a stud 64. A fixed pin 65 on body 11 engages in a slot 66 formed in lever 62 also to pivot the latter about pin 65, for a purpose to be presently described. When the back is opened and the carriage 56 moves downwardly to the position shown in Fig. 3, the lever 62 pivots about pin 65. A coil spring is wrapped around stud 64 and has an arm 67 which engages under a lug 68 on lever 62 and tends to rock the latter in a clockwise direction to bring a hook 69 on the free end of lever 62 into engagement with the surface of eccentric 22. Now when the leader strip is drawn over roll 20, the latter is rotated, also to rotate eccentric 22 until a notch 70 thereon is brought into registry with hook 69. At this point, the spring arm 67 rocks lever 62 about stud 64 to move hook 69 into notch 70 to lock roll 20, eccentric 22 and pawl 23 against further movement to phase these parts which are then in the position illustrated in Fig. 2. As the winding of the leader strip continues, the strip merely slides or skids over the roll 20 but without rotating the latter. When, however, the indexing mark on the film reaches the center of the exposure frame, the initial winding of the leader strip is completed and the parts actuated by the film strip are in proper phased relation, and the back 12 may be closed.

A second lever 73 has one end pivoted on stud 64 while the free end is formed to provide an offset hook or pawl 74 which is bent out of the plane of the lever 73, for a purpose to be presently described. An arm 75 of the spring wrapped about stud 64, engages under pawl 74 and tends to rock the latter about stud 64 in a counter-clockwise direction. It will be recalled that when the back was opened the mutilated area 28 of wheel 26 is in registry with the end 24 of pawl 23. Now, as the back is closed, the latter engages finger 59 to move the carriage 56 upwardly, against the action of the spring 60 to the position shown in Fig. 1. Such movement serves to bring end 24 of pawl 23 into engagement with portion 28 of wheel 26. In addition, lever 73 has imparted thereto, by the upward movement of the carriage 56, a slight clockwise movement to bring pawl 74 into engagement with a tooth 25 adjacent area 28 and to rock wheel 26 slightly in a counter-clockwise direction to move the area 28 out of registry with the end 24 to position the latter against the first tooth 25. Thus, the closing of the camera back serves to index or move the wheel 26 to phase the latter as well as wheel 29 and the counter dial 32. The various parts are now connected in operative relation so as to be moved and controlled by the movement of the leader strip or the film strip over the roll 20. However, the pawl 33 and end 50 still ride on the smooth portion 52 of wheel 29 so that the pawl 37 is held out of engagement with the ratchet 15 to free the spindle 14 to permit winding of the leader strip.

As mentioned above, the leader strip is moved initially to a position to bring an index mark thereon to the middle of the exposure frame before closing the back. The leader strip is so designed that the distance between the index mark and the first image area is exactly four image frames. The result is that the leader strip must be moved a distance of exactly four image frames before the first exposure area of the film strip is brought into registering position over the exposure frame. During this four-frame movement, the roll 20 is rotated exactly four times to impart four actuations to pawl 23 to cause the latter to rotate or index wheel 26 exactly four teeth. When this position is reached, the first image area has been moved into position. Also, the pawl 33 and end 50 have reached the end of the smooth portion 52 and drop into the first recess 30 to actuate lever 34 to move pawl 37 into locking relation with the ratchet 15. The indexing means is then in the position shown in Fig. 3, which represents the start of the exposure cycle.

Now after each exposure is made, the lever 38 is moved manually to rock lever 34 in a clockwise direction to disengage pawl 33 and end 50 from the registering recess 30. Pawl 47 then moves longitudinally to lever 34, by reason of spring 49, to move end 50 out of registry with pawl 33. Now upon release of lever 38, it is returned to the initial position by spring 41, and springs 36 and 42 then rock lever 34 to bring end 50 into engagement with the periphery of the wheel 29 between recesses 30. When the film strip has been again moved the distance of one frame, the next recess 30 is brought into registry with end 50 and the latter and pawl 33 drop into the recess under the action of spring 42 to move lever 34 to bring pawl 37 into locking relation with the ratchet 15.

Thus, at the end of each winding operation, the film winding mechanism is completely and automatically locked against further movement. After the last exposure, the wheels 26 and 29 are moved to a neutral or free-wheeling position in which pawl 37 is held out of engagement with ratchet 15, and the mutilated area 28 of wheel 26 is in registry with pawl end 24 so that the movement of the latter will not index wheels 26 and 29, as shown in Fig. 2. When the camera back is opened and the leader strip is being initially wound, the roll 20 and pawl 23 are disconnected from the indexing means and are properly phased and locked. However, when the camera back is closed, wheels 26 and 29 are phased and then connected in operative relation to roll 20 so as to be actuated and controlled thereby. By means of such an arrangement, accurate metering of the film strip is assured. Also, the proper phasing of the parts enables the mechanism to operate in time relation with the film strip to insure complete exposure thereof. The structure is positive in its action, automatic and accurate.

While one embodiment of the invention has been disclosed, it is apparent that the inventive idea may be carried out in a number of ways. Therefore, the present invention is not to be limited except as necessitated by the prior art and the scope of the appended claims.

What I claim and desire to secure by Letters Patent of the United States is:

1. In a roll film camera having a camera body provided with a back adapted to be moved selectively to open or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an operating pawl actuated by said roll and engaging said indexing means to control the latter in timed relation to the movement of said film, said indexing means being movable to a neutral position when the film strip is completely wound on said spindle, means on said indexing means for moving said first pawl out of engagement with said ratchet when said indexing means is in said neutral position to free said spindle to permit reloading of said camera, a member movably mounted on said body adjacent said operating pawl, means for moving said member in one direction upon opening said back, means on said member for disconnecting said operating pawl from said indexing means when said back is opened to retain said indexing means in said neutral position during reloading, means controlled by said back for moving said member in the opposite direction to release said operating pawl when said back is closed, means for engaging said operating pawl to said indexing means, and an indexing pawl carried by said member and engageable with said indexing means when said member is moved in said opposite direction to move said indexing means from said neutral position independently of said roll so as to connect said indexing means in operative relation to said roll so as to be moved thereby upon movement of the film strip.

2. In a roll film camera having a camera body provided with a back adapted to be moved selectively to opened or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an operating pawl actuated by said roll and engaging said indexing means to control the latter in timed relation to the movement of said film, said indexing means being movable to a neutral position when the film strip is completely wound on said spindle, means on said indexing means for moving said first pawl out of engagement with said ratchet when said indexing means is in said neutral position to free said spindle to permit reloading of said camera, a member movably mounted on said body adjacent said operating pawl, means for moving said member in one direction upon opening said back, means on said member for disconnecting said operating pawl from said indexing means when said back is opened to retain said indexing means in said neutral position during reloading, means controlled by said back for moving said member in the opposite direction to release said operating pawl when said back is closed, means for engaging said operating pawl to said indexing means, an indexing pawl movably mounted on said member and normally in contact with said indexing means but movable out of engagement therewith when said member is moved in said one direction, and means for positioning said indexing pawl on said member so that when said member is moved in the opposite direction upon closing said back said indexing pawl will engage said indexing means to move the latter from said neutral position independently of said roll to connect said indexing means operatively to said roll so that the latter will control said indexing means and said first pawl in timed relation to the movement of said film.

3. In a roll film camera having a camera body provided with a back adapted to be moved selectively to opened or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an operating pawl actuated by said roll and engaging said indexing means to control the latter in timed relation to the movement of said film, said indexing means being movable automatically to a neutral position when the film strip is completely wound on said spindle, means on said indexing means for moving said first pawl out of engagement with said ratchet when said indexing means is in said neutral position to free said spindle to permit reloading of said camera, means for moving said operating pawl out of engagement with said indexing means when said back is opened and with said indexing means in said neutral position, means for limiting the rotation of said roll for phasing said roll and operating pawl when said camera is loaded, means on the operating pawl moving means for adjusting said indexing means when said back is closed to move said indexing means from said neutral position to phase said indexing means, and means for connecting the phased roll and operating pawl in engagement with the phased indexing means to connect the latter in operative relation to said roll so as to be controlled in response to movement of said film strip.

4. In a roll film camera having a camera body provided with a back adapted to be moved selectively to opened or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an operating pawl actuated by said roll and engaging said indexing means to control the latter in timed relation to the movement of said film, said indexing means being movable automatically to a neutral position when the film strip is completely wound on said spindle, means on said indexing means for moving said first pawl out of engagement with said ratchet when said indexing means is in said neutral position to free said spindle to permit reloading of said camera, a member movably mounted on said body adjacent said operating pawl and normally disconnected therefrom, means for moving the member in one direction when said back is opened, means for connecting said member to said operating pawl to disconnect the latter from said indexing means when said member is moved in said one direction, means controlled by the film strip in loading the camera to limit the rotation of said roll to phase said roll and operating pawl when disconnected from said indexing means, means controlled by said back for moving said member in the opposite direction when said back is closed, means on said member for engaging said indexing means to move the latter from its neutral position when said back is closed, and means for connecting the phased operating pawl in operative relation with the phased indexing means.

5. In a roll film camera having a camera body provided with a back adapted to be moved selectively to opened or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an operating pawl actuated by said roll and engaging said indexing means to control the latter in timed relation to the movement of said film, said indexing means being movable automatically to a neutral position when the film strip is completely wound on said spindle, means on said indexing means for moving said first pawl out of engagement with said ratchet when said indexing means is in said neutral position to free said spindle to permit reloading of said camera, a member movably mounted on said body adjacent said operating pawl and normally disconnected therefrom, means for moving the member in one direction when said back is opened, means on said member for connecting said member to said operating pawl to disconnect the latter from said indexing means when said member is moved in said one direction, means controlled by the film strip in loading the camera to limit the rotation of said roll to phase said roll and operating pawl when disconnected from said indexing means, means controlled by said back for moving said member in the opposite direction when said back is closed, an indexing pawl carried by said member and engaging said indexing means when said member is moved in said opposite direction to shift said indexing means from said neutral position to phase said indexing means, and means to connect the phased indexing means in operative relation with the phased roll to move in timed relation relative to the latter.

6. In a roll film camera having a camera body provided with a back adapted to be moved selectively to open or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an eccentric carried by said roll, an operating pawl connected to said eccentric and reciprocated upon movement of said roll to engage and move said indexing means in timed relation to the movement of said film, means for disconnecting said eccentric and operating pawl from said indexing means when said back is opened to permit threading and reloading of an unexposed film strip in said camera, means for locking said eccentric in a definite position to phase said eccentric and operating pawl relative to the position of the film strip being loaded, means controlled by the closing of said back for phasing said indexing means, and means rendered operative upon the closing of said back to move said phased operative pawl into engagement with said phased indexing means to connect the latter to said roll for operation in timed relation to the movement of the film strip.

7. In a roll film camera having a camera body provided with a back adapted to be moved selectively to open or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an eccentric carried by said roll, an operating pawl connected to said eccentric and reciprocated upon movement of said roll to engage and move said indexing means in timed relation to the movement of said film, means for disconnecting said eccentric and operating pawl from said indexing means when said back is opened to permit threading and reloading of an unexposed film strip in said camera, means controlled by said disconnecting means for locking said eccentric in a definite position to phase said eccentric and operating pawl relative to the film strip being loaded in said camera, means for phasing said indexing means when said back is closed, means rendered effective upon closing said back to disengage said locking means, and means to move the phased operating pawl into operative relation with the phased indexing means to control the latter in timed relation to the film wound by said spindle.

8. In a roll film camera having a camera body provided with a back adapted to be moved selectively to open or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an eccentric carried by said roll, an operating pawl connected to said eccentric and reciprocated upon movement of said roll to engage and move said indexing means in timed relation to the movement of said film, a carriage slidably mounted on said body adjacent said operating pawl, means rendered effective to shift said carriage in one direction when said back is opened, means for connecting said pawl to said carriage when the latter is moved in said direction to disengage said operating pawl from said indexing means, said eccentric and roll being rotated by the movement of a film strip thereover when the strip is being threaded in the camera and connected to the spindle, a pivoted lever mounted on said body, means for connecting said lever to said carriage so as to move said lever into locking relation with said eccentric to phase said eccentric and operating pawl when said back is open, means on said back for moving said carriage in the opposite direction to disconnect said lever from said phased eccentric, an indexing pawl carried by said carriage and movable into engagement with said indexing means to shift the latter from its neutral position to phase said indexing means, and means for moving the phased operating pawl into operative engagement with the phased indexing means so that the latter may be controlled from said roll and in timed relation with movement of the film strip.

9. In a roll film camera having a camera body provided with a back adapted to be moved selectively to open or closed position, the combination with a rotatable take-up spindle positioned in one end of said camera for winding up a film strip after each exposure, a ratchet carried by said spindle, a movable pawl, a measuring roll engaged and rotated by the movement of said strip and in timed relation therewith, of indexing means connected to said pawl to permit the latter to move into locking relation with said ratchet when a predetermined length of film has been wound, an eccentric carried by said roll, an operating pawl connected to said eccentric and reciprocated upon movement of said roll to engage and move said indexing means in timed relation to the movement of said film, a carriage slidably mounted on said body adjacent said operating pawl, means rendered effective to shift said carriage in one direction when said back is opened, means for connecting said pawl to said carriage when the latter is moved in said direction to disengage said operating pawl from said indexing means, said eccentric and roll being rotated by the movement of a film strip thereover when the strip is being threaded in the camera and connected to the spindle, a pivoted lever mounted on said body, means for connecting said lever to said carriage so as to move said lever into locking relation with said eccentric to phase said eccentric and operating pawl when said back is open, means on said back for moving said carriage in the opposite direction to disconnect said lever from said phased eccentric, a spring-pressed indexing pawl pivotally mounted on said carriage means to position said indexing pawl on said carriage so that as the latter is moved in said opposite direction said pawl will engage and move said indexing means from its neutral position to phase said indexing means, the movement of said carriage in said opposite direction serving to disconnect the carriage from said operating pawl, and spring means for moving the freed and phased operating pawl relative to said eccentric and into engagement with said indexing means to connect the latter in operative relation said roll to be controlled in timed relation to the movement of the film strip.

10. In a roll film camera having a camera body, the combination with a rotatable take-up spindle for winding up a film strip after each exposure, a ratchet carried by said spindle, a movable pawl, a measuring roll positioned on said body to be engaged and rotated by the movement of said strip and in timed relation therewith, of indexing means connected to said pawl to permit the latter to move into locking relation with said ratchet when a predetermined length of film has been wound, an operating pawl mounted on said body and having one end adapted to engage said indexing means to actuate the latter, means for connecting the other end of said operating pawl eccentrically to said roll so that rotation of the latter will impart a reciprocating movement to said operating pawl to actuate said indexing means in timed relation to the movement of the film strip, means rendered operative only after the last exposure has been made on said strip for disconnecting said indexing means from said roll to free the latter to permit the winding of trailer and leader portions of said strip without operating said indexing means, means for automatically phasing said indexing means when the latter are disconnected from said roll, and means controlled by the winding of said leader portion to phase said operating pawl.

CAMERON B. ESTES.

REFERENCES CITED

The following references are of record in the file of this patent:

UNITED STATES PATENTS

| Number | Name | Date |
|---|---|---|
| 2,544,879 | Harvey et al. | Mar. 13, 1951 |

FOREIGN PATENTS

| Number | Country | Date |
|---|---|---|
| 226,239 | Switzerland | July 1, 1943 |